Figure 2:
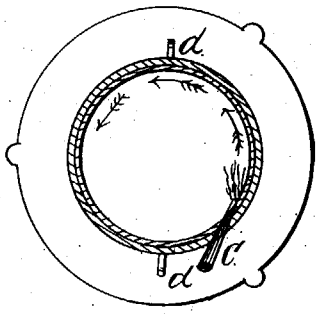

No. 1,402.

REISSUED FEB. 10, 1863.

C. SHUNK.

REFINING IRON.

Witnesses.
Charles Smith
Octavius Knight

Inventor,
Christian Shunk

UNITED STATES PATENT OFFICE.

CHRISTIAN SHUNK, OF CANTON, OHIO.

IMPROVEMENT IN REFINING IRON.

Specification forming part of Letters Patent No. 24,766, dated July 12, 1859; Reissue No. 1,402, dated February 10, 1863.

DIVISION B.

*To all whom it may concern:*

Be it known that I, CHRISTIAN SHUNK, formerly of Slate Lick, in the county of Armstrong and State of Pennsylvania, now of Canton, in the county of Stark and State of Ohio, have invented a new and useful apparatus, crucible, or fire-place for converting molten crude iron into refined iron or steel from the ore or from remelted pig or crude iron by the application of atmospheric air under pressure.

This outside fire-place or crucible can be made of any inconsumable materials to resist the action of the fluid iron. It can be made of plate-iron lined with fire-clay cement, and it is preferable to make it in two parts for the purpose of lining the inside, as well as for cleaning out the bottom after each refining process. The top part is readily removed, being attached by a couple of fastenings or drop-latches, for the convenience of the workman, and can be made stationary or movable, to suit the convenience of the manufacturer, and can be depressed in the ground or raised to suit the adaptation of the hearth of the iron-smelting furnace. For the discharge of the molten iron from the smelting-furnace into the refining fire or crucible a gutter or conductor is attached, leading into the crucible. This conductor can be made of plate-iron lined with clay, mortar, or cement. This refining-crucible can be made with handles or swung in an iron frame, as may be desired. Before the crude iron is run in to be operated on by the blast the crucible should be heated to a moderate degree by placing inside or under it a few live coals. I prefer the refining fire-place or crucible made round. The action of the blast of air forced into a cylinder-shaped pot produces more readily a rotary motion of the mass of metal when attacked by a current of air forced under pressure, and thereby a more speedy ebullition of the iron is effected by combining the gases of the air with the carbon of the crude iron while the mass of fluid iron is in active motion and ebullition. The refining tuyere-pipe or openings for the discharge of the air must be placed so as to discharge the full volume of the blast into and to commingle it with the crude iron and its carbon for the purpose of effecting the decarbonizing and steelifying process. The volume of air and pressure of blast required to effect the decarbonizing and purifying process depends on the quantity of crude iron run into the crucible, and is readily understood by the workman. After the refining and purifying process is finished the metal is tapped at the bottom by removing a fire-clay stopper used for that purpose; or a properly-constructed valve can be attached for the discharge of the refined metal, which is then molded into pig or ingot chills fit for the hammer or the rolls.

The atmospheric air can be introduced into the refining-crucible in various ways, so as to commingle the gaseous matter of the air with the fluid iron and its carbon; but I find it preferable to force the blast through one or more tuyere-pipes from the top, dipping down into the mass of metal, and thereby to combine the gases of the air with the crude iron to be refined and steelified. It is preferable to have the refining tuyere-pipe dip down into the fluid iron tangentially to the circumference, and thereby cause a spiral or rotary motion of the metal by the power of the blast, and which greatly relieves the pressure of the iron from the mouth of the blast-pipe by passing round in the same direction with the blast; and by giving the mass of fluid iron a spiral motion during the purifying process a more perfect admixture of the gases of the air with the fluid iron is effected and a more speedy ebullition takes place than otherwise would be if the blast entered directly against a body of iron standing still.

My refining tuyere-pipes I make of plumbago or any inconsumable materials to resist the action of the molten metal. The refining and steelifying process requires but a few minutes, according to the quantity of crude iron to be operated on. When the oxygen gas of the air combines with the carbon of the molten crude iron, the heat and fluidity are increased, and ebullition takes place, the carbon combines freely with the oxygen, producing a bright flame at the top of the refining fire or crucible, which increases for a few minutes, then decreases, by which the quality of the product is readily determined by the workman; first, partially decarbonized or refined iron or steel is obtained when the flame is up; second, when the flame drops soft or semi steel of tenacity and tensile strength to mold into ingot-chills.

In the make and construction of my refining fire or crucible I do not confine myself to any specific form or details of the same, nor to any specified mode of introducing the atmospheric air therein to combine with the molten iron to be refined and steelified.

The accompanying drawings illustrate a form of refining-crucible which I have used with good effect.

Figure 1:
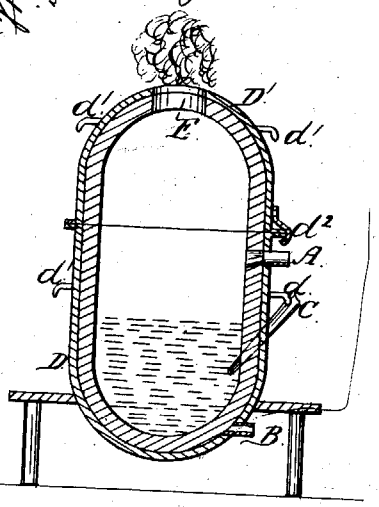

Figure 1 is a vertical section of the said crucible. Fig. 2 is a horizontal section of the same.

Similar letters of reference indicate corresponding parts in both views.

A represents the gutter, which receives the molten metal from the hearth of the blast-furnace and delivers it into the auxiliary hearth or crucible. B is the tapping-hole through which the metal is drawn after the refining process is completed. C is a tuyere made of graphite, plumbago, or other incombustible material, which tuyere is introduced in an oblique direction, tangential, or nearly so, with the periphery of the crucible and dipping downward, so as to commingle the air with the entire mass of iron and impart a rotary or spiral motion thereto by the action of the blast, as before explained. *d d'* are stationary hooks for lifting the crucible D and cover D', respectively. $d^2$ are catches by which the cover may be held in place while in use. E is an aperture for the escape of carbonic-acid gas and other impurities evolved by the refining process.

While much preferring, for reasons already stated, to introduce the blast in an oblique rather than a radial direction, I do not confine myself thereto.

The blast may be applied either hot or cold.

Having thus described my invention and a way in which the same may be carried into effect, what I claim therein as new, and desire to secure by Letters Patent, is—

A separate or auxiliary refining pot or crucible, employed to receive molten iron from a smelting or remelting furnace and decarbonize the same by the application of an air-blast in any manner, substantially as herein described, for the production of steel or refined iron.

CHRISTIAN SHUNK.

Witnesses:
OCTAVIUS KNIGHT,
CHARLES SMITH.